United States Patent [19]
Erving et al.

[11] Patent Number: 5,815,527
[45] Date of Patent: Sep. 29, 1998

[54] METHOD AND APPARATUS FOR SWITCHING SPREAD SPECTRUM/CODE DIVISION MULTIPLE ACCESS MODULATED BEAMS

[76] Inventors: Richard Henry Erving, 3 Overbrook Rd., Piscataway, N.J. 08854; Diakoumis Parissis Gerakoulis, 135 Oak St., Dover, N.J. 07801

[21] Appl. No.: 635,163

[22] Filed: Apr. 23, 1996

[51] Int. Cl.$^6$ ............................ H04J 13/04; H04L 12/00; H04B 1/707; H04B 7/216

[52] U.S. Cl. .......................... 375/206; 370/320; 370/323; 370/441; 370/479

[58] Field of Search .................................. 375/200, 206; 370/209, 320, 323, 441, 479

[56] References Cited

U.S. PATENT DOCUMENTS

| | | | |
|---|---|---|---|
| 4,491,947 | 1/1985 | Frank | 370/323 |
| 5,239,545 | 8/1993 | Buchholz | 370/348 |
| 5,365,590 | 11/1994 | Brame | 380/49 |
| 5,506,848 | 4/1996 | Drakopoulos et al. | 370/336 |

OTHER PUBLICATIONS

Bonuccelli, "A Fast Time Slot Assignment Algorithm for TDM Hierarchial Switching Systems," IEEE Transactions on Communications, vol. 37, No. 8, Aug. 1989.

Stern, "Design Issues Relevant to Developing an Integrated Voice/Data Mobile Radio System", IEEE Transactions on Vehicular Technology, vol. 39, No. 4, Nov. 1990.

Acampora et al., "A Metropolitan Area Radio System Using Scanning Pencil Beams", IEEE Transactions on Communications, vol. 39, No. 1, Jan. 1991.

Rose, "Rapid Optimal Scheduling for Time–Multiplex Switches Using a Cellular Automation", IEEE Transactions on Connumications, vol. 37, No. 5, May 1989.

Inukai, "An Efficient SS/TDMA Time Slot Assignment Algorithm", IEEE Transactions on Communications, vol. COM–27, No. 10, Oct. 1979.

Sriram et al., "Discrete–Time Analysis of Integrated Voice/Data Multiplexers With and Without Speech Activity Detectors", IEEE Journal on Selected Areas in Communications, vol. SAC–1, No. 6, Dec. 1983.

Rose et al., "The Performance of Random and Optimal Scheduling in a Time–Muliplex Switch", IEEE Transactions on Communications, vol. CDM–35, No. 8, Aug. 1987.

Primary Examiner—Stephen Chin
Assistant Examiner—Jeffrey W. Gluck
Attorney, Agent, or Firm—Alfred G. Steinmetz

[57] ABSTRACT

Switching of traffic channels within spread spectrum beams is performed in a satellite without buffering of the individual signals. Individual satellite beams carrying spread spectrum user RF signals from a plurality of customer premise equipments are received by radio receivers of a satellite switch and downconverted to IF signals. Traffic channel recovery is performed immediately after the down conversion, and digital encoding and decoding is performed to route each channel to an appropriate outbound satellite beam. Traffic channel recovery is by despreading and filtering followed by respreading to uniquely identify each user signal so it may be recovered at its end destination. Further spreading uniquely identifies the user signal with an outbound satellite beam going to the intended destination of the user signal.

11 Claims, 4 Drawing Sheets

SATELLITE SWITCHED/CODE DIVISION MULTIPLE ACCESS(SS/CDMA)
CODE SWITCHING SYSTEM ARCHITECTURE

ACRU: ACCESS CHANNEL RECEPTION UNIT
SBTU: SATELLITE BROADCAST TRANSMITTER UNIT
CDM: CODE DIVISION MULTIPLEXER

FIG. 4

THE TRAFFIC MATRIX, T $T = [t_{ij}]$ $t = \{u_1, u_2, ..., u_k, ...\} \quad k = 1, 2, ...$ $u_k = (g_i, g_j, W_{nu}, W_{nd})$ $t_{ij}$: REPRESENTS THE SET OF REQUESTS ($k = 1, 2, ...$) FROM UPLINK BEAM i TO DOWNLINK BEAM j.

$g_i$ and $g_j$: REPRESENTS THE PN-CODES IDENTIFYING THE UPLINK AND DOWNLINK BEAMS, RESPECTIVELY.

$W_{nu}$ and $W_{nd}$: REPRESENT THE WALSH CODES IDENTIFYING THE TRAFFIC CHANNEL OR THE USER WITHIN THE WB-CDMA CHANNEL FOR THE UPLINK AND DOWNLINK, RESPECTIVELY

EXAMPLE:

DOWNLINK BEAM →

$$T = 2 \begin{array}{c|ccc} & 1 & 2 & 3 \\ \hline 1 & u_2 & u_3 & u_1 \\ 2 & (u_4,u_5) & 0 & u_6 \\ 3 & 0 & u_7 & (u_8,u_9) \end{array} \begin{array}{l} \rightarrow u_2 + u_3 + u_1 \\ \rightarrow u_4 + u_5 + u_6 \\ \rightarrow u_7 + u_8 + u_9 \end{array} \text{(UPLINK ROW SUM)}$$

↑ UPLINK BEAM $u_2 + u_4 + u_5 \quad u_1 + u_7 \quad u_1 + u_6 + u_8 + u_9$ $u_3 + u_7$ (DOWNLINK COLUMN SUM)

METHOD AND APPARATUS FOR SWITCHING SPREAD SPECTRUM/CODE DIVISION MULTIPLE ACCESS MODULATED BEAMS

FIELD OF THE INVENTION

This invention relates to switching apparatus and methods to be used in wired and/or wireless digital telecommunication systems for message switching. It is particularly concerned with the switching of spread spectrum/CDMA modulated beams carrying traffic channels from a specific source to a specific destination.

BACKGROUND OF THE INVENTION

Digital switching of spread spectrum/CDMA digital telecommunication signals has previously been limited to circuit and packet switching. Packet type switching is batch transmission signaling and generally requires the use of a buffer memory somewhere in the transmission process. The switching (i.e., CDMA message multiplexing) of end-to-end CDMA complete message signals, without the buffering requirement, has been considered to have complexity sufficient to render it impractical and uneconomical. In some instances a CDMA beam may be redirected, but the individual traffic channels included within each uplink beam are left undisturbed in a corresponding downlink CDMA beam. Uplink CDMA beams are redirected and become a downlink beam, but include the same traffic channels. So traffic channels must have common destinations with the common redirected CDMA beam in which they are included.

In some instances the handling of CDMA packet beams requires the conversion of the CDMA traffic channels to baseband frequencies for switching and redirection processes to occur.

SUMMARY OF THE INVENTION

Therefore in accord with the invention a method and apparatus for switching traffic channels between uplink and downlink spread spectrum/CDMA modulated beams is disclosed as claimed in the claims. It particularly concerns CDMA information traffic channel (i.e.,message) switching in which a total aggregate information signal is switched at IF frequency without memory buffering required in the process.

In a particular embodiment of the invention individual satellite beams carrying spread spectrum user RF signals from a plurality of customer premise equipments are received by radio receivers of a satellite switch and downconverted to IF signals. Traffic channel recovery is performed immediately after the down conversion, and digital encoding and decoding is performed to route each channel to an appropriate outbound satellite beam.

Traffic channel recovery is by despreading and filtering followed by respreading to uniquely identify each user signal so it may be recovered at its end destination. Further spreading uniquely identifies the user signal with an outbound satellite beam going to the intended destination of the use signal.

BRIEF DESCRIPTION OF THE DRAWING

FIG. 4 is a schematic of the matrix arrangement for directing traffic channels to the proper destination directed outgoing CDMA beam.

DETAILED DESCRIPTION

Figure 1:
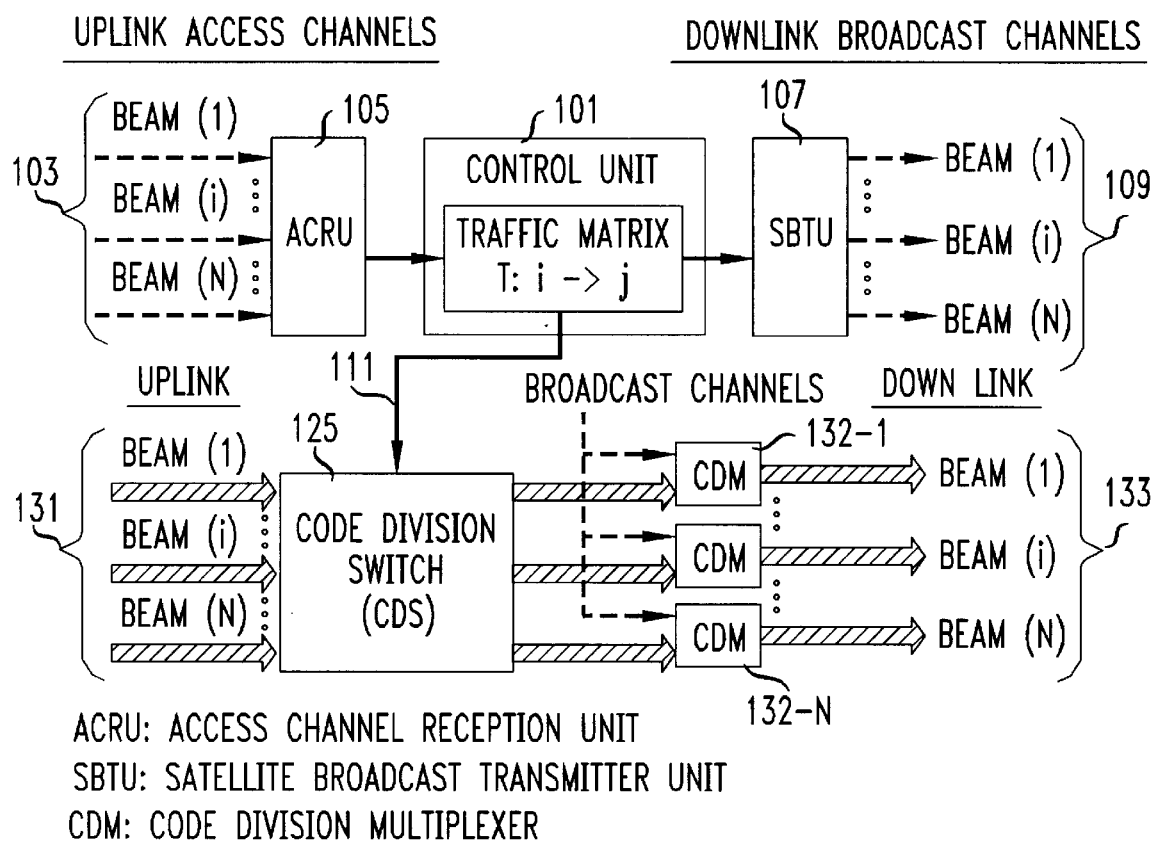
FIG. 1 is a block schematic of a code switching system architecture.

A code switching architecture, such as shown in FIG. 1, includes a control unit 101 having memory storage for a traffic matrix relating uplink sources to intended downlink destinations. Uplink access channels 103, which may comprise a plurality of uplink data and access CDMA beams 1 through N, are directed to an Access Channel Reception unit 105 for processing and for whose output is directed to the control unit 101. The output of the control unit 101 is applied to a Satellite Broadcast Transmitter Unit 107 where it supplies the downlink broadcast data and access channels over the CDMA beams 109. A second output of the control unit is applied, via lead 111, to a code division switch 125.

Code division switch 125 accepts a plurality of bearer CDMA modulated RF beams 131, extracts the individual traffic channels contained within each beam and combines them into outgoing beams having a destination in common with the traffic channels it contains. The destination traffic channels are inserted into downlink CDMA beams 133, in accord with broadcast channels applied to CDMA multiplexers 132-1 to 132-N, for transmission to specific downlink destinations.

While a satellite application, using an air interface is shown as an illustrative embodiment, the invention is not limited to satellite communication systems. The invention is equally applicable to terrestrial communication systems and to systems using wired and optical connections.

Figure 2:
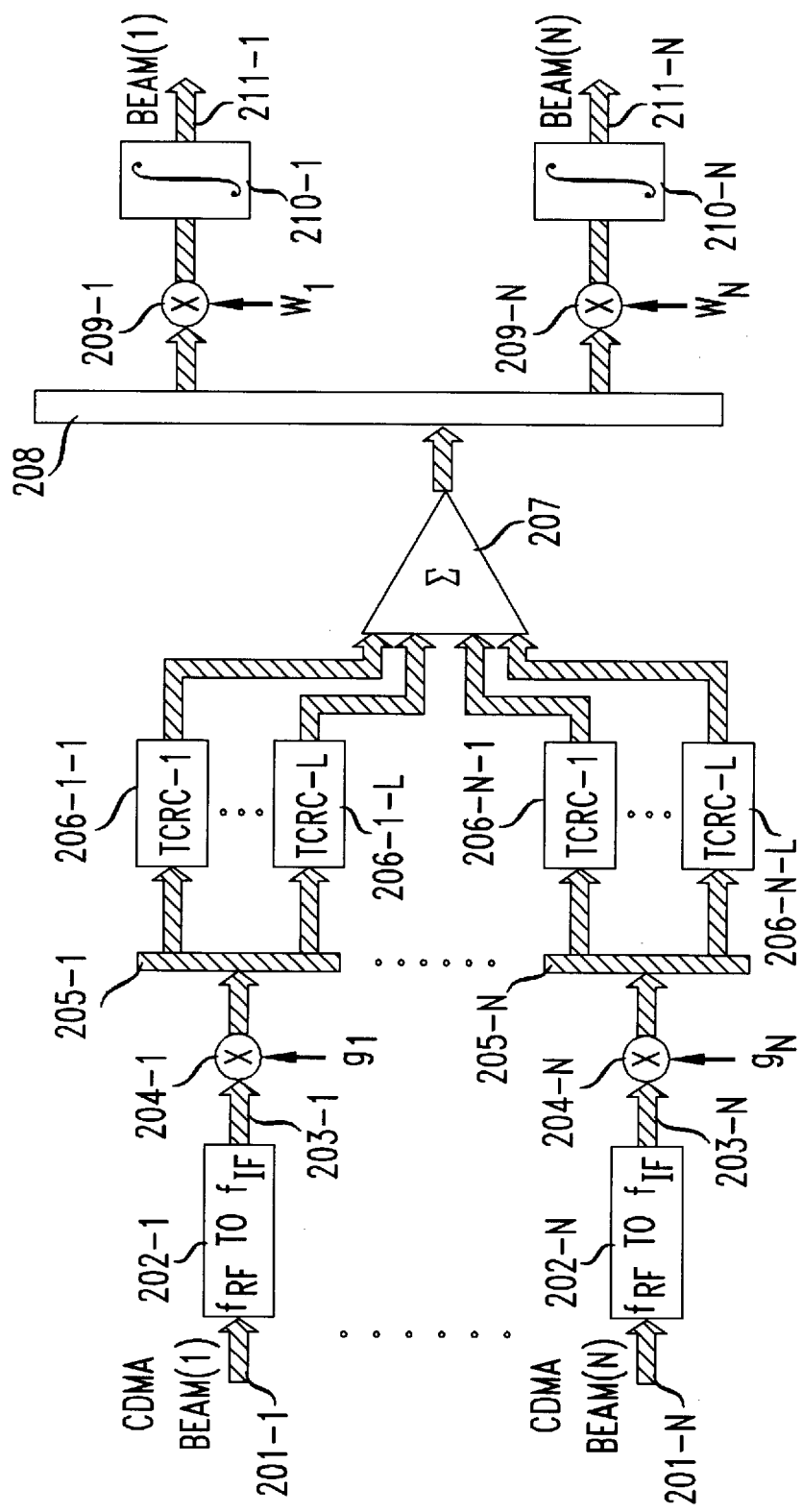
FIG. 2 is a block schematic of a code division switch.

In FIG. 2 a plurality of incoming spread spectrum RF beams 201-1 to 201-N are all applied to downconversion units 202-1 to 202-N which convert the beams to IF. The downconverted IF beams 203-1 to 203-N are spread with pseudo-random beam codes $g_n$ applied to the mixer circuits 204-1 to 204-N to identify the individual traffic channels. In the illustrative embodiment $g_n$ may be a Gold code with slight interference between adjacent satellite beams. The coded signals, from each mixer, are applied to buses 205-1 to 205-N which are coupled to several traffic channel recovery circuits 206-1-1 to 206-1-1 and 206-N-1 to 206-N-1. The individual traffic channels are recovered from each of the IF beams by despreading and respreading techniques as described with respect to FIG. 3. The output of all the traffic channel recovery circuits are summed in common in the summer 207 and applied in common to the overspread bus 208 which carries the overspread signals from the traffic channel recovery circuits 206-1-1 to 206-1-L to 206-N-1 to 206-N-L. to the mixers 209-1 through 209-N.

Outputs of overspread beams from the bus 208 are recovered by despreading with a Walsh code $W_{v'}$ in the mixers 209-1 to 209-N to prevent overlap of the adjacent satellite beams. By integrating (i.e., analog) or accumulating (i.e., digital) the spread beam in integrators 210-1 to 210-N recovers the signal over the code length in order to generate the outgoing spread spectrum beams 211-1 to 211-N having destinations in harmony with the channels they contain.

Figure 3:
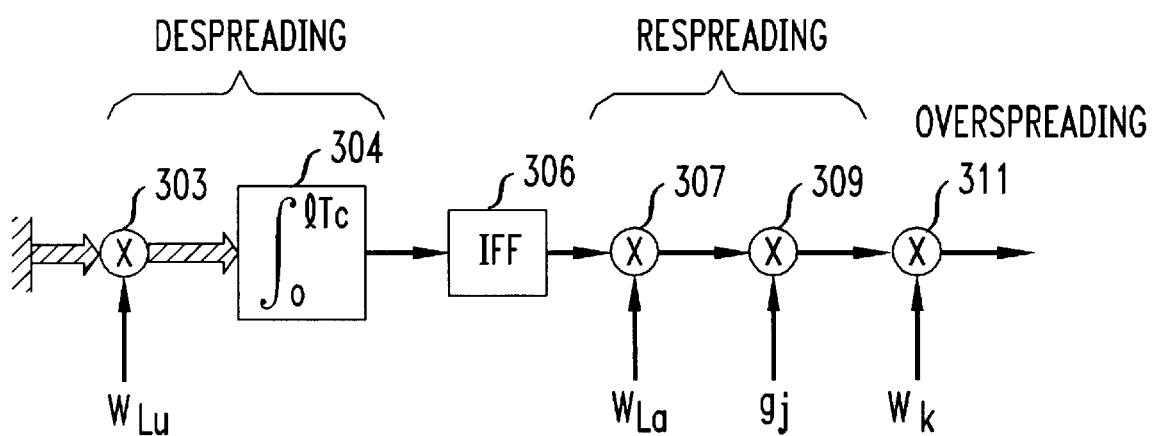
FIG. 3 is a block schematic of a traffic channel recovery circuit which is a sub-component of the code division switch.

A suitable traffic channel recovery circuit shown in the FIG. 3 accepts the output of one of buses 205-N and applies it to a mixer 303 where the traffic channel, in the illustrative embodiment, is despread with a Walsh code $W_v$ to keep traffic channels from overlapping within a beam. This despread traffic channel is integrated in the integrator 304 to reduce the sample rate to the symbol rate. Subsequently the integrated signal is filtered by the IF filter 306. If the despreading is done digitally, the filtering step is incorporated in the despreading operation. The filtered traffic channel is respread by an output beam Walsh code $W_{na}$ in the mixer 307 to uniquely identify the user and further respread by a downlink pseudo random beam code in the mixer 309 to identify the outgoing beam transporting the traffic channel. The output of mixer 309 is overspread with an orthogonal Walsh code $W_k$ in the mixer 311 to separate the output beams on the overspread bus. The output of mixer 311 for application to the summing circuit is as shown in FIG. 1.

A matrix is used, in the illustrative embodiment, for coupling traffic channels of an incoming CDMA beam to an outgoing CDMA beam. An illustrative matrix (for three beams) which may be used in the control unit for directing uplink traffic channels to downlink beams is shown in the FIG. 4 and may be contained in the control unit as part of a stored program. As shown the columns are identified with the downlink CDMA beams and the rows are identified with the uplink CDMA beams. Each uplink and downlink CDMA contains a plurality of user traffic incoming channels $U_n+U_m+ - - - +U_p$ and outgoing $U_a+U_b+ - - - +U_c$, respectively. The matrix entries indicate the codes to be used for the uplink and downlink traffic channels. This assures that the downlink traffic channels are included in the desired downlink beam.

The invention claimed is:

1. A method of switching a channel from an incoming spread spectrum beam to an outgoing spread spectrum beam, comprising the steps of:

coding each channel in the incoming spread spectrum beam in a manner to enhance channel separation and reduce interference between individual channels contained within the beams and recovering individual traffic channels by application of a user-specific pseudo random beam code;

summing all recovered traffic channels onto an overspread bus;

directing and combining recovered individual traffic channels from the overspread bus into outgoing spread spectrum beams, each having a destination in common with the traffic channels it contains.

2. A method of switching a channel from an incoming spread spectrum beam to an outgoing spread spectrum beam as claimed in claim 1:

wherein the step of coding each channel includes overspreading with application of an overspreading code.

3. A method of switching a channel from an incoming spread spectrum beam to an outgoing spread spectrum beam as claimed in claim 1:

wherein each step of coding each channel includes IF filtering of the traffic channel during traffic channel recovery.

4. A method of switching a channel from an incoming spread spectrum beam to an outgoing spread spectrum beam as claimed in claim 1:

wherein the step of directing and combining includes a step of mixing with a Walsh code and summing the mixed signal for a code word length.

5. A method of switching a channel from an incoming spread spectrum beam to an outgoing spread spectrum beam as claimed in claim 4:

wherein the step of directing and combining further includes a step of recovering individual outgoing beams by application of a despreading code in a mixer.

6. A switching system for switching a channel from an incoming spread spectrum beam to an outgoing spread spectrum beam, comprising:

frequency conversion circuitry connected for receiving incoming spread spectrum RF beams and for converting them to IF signals;

mixer circuitry for despreading the IF signals with a pseudo-random beam code;

a plurality of traffic channel recovery mixer circuits connected to receive the despread IF signals and operating to recover individual traffic channels;

a plurality of destination selecting mixers each connected to receive the traffic channel recovery circuit output and applying an overspreading code to the traffic channels;

means for forming outgoing spread spectrum beams having destinations in common with traffic channels contained within.

7. A switching system for switching a channel from an incoming spread spectrum beam to an outgoing spread spectrum beam, as claimed in claim 6;

wherein the plurality of destination selecting mixers include:

first destination selection mixers for identifying the users within the destination beam; and second destination selection mixers for identifying the output beams and their destinations.

8. A switching system for switching a channel from an incoming spread spectrum beam to an outgoing spread spectrum beam, as claimed in claim 6;

wherein each outgoing beam is mixed in a mixer with an orthogonal code and processed by an integrator for the length of an overspreading code to recover an outgoing channel.

9. A switching system for switching in the sky a channel from an incoming spread spectrum RF beam to an outgoing spread spectrum RF beam, characterized by:

frequency conversion circuitry connected for receiving incoming spread spectrum RF beams and for down-converting them to IF signals;

means for applying pseudo-random beam codes $g_n$ to identify individual channels;

a plurality of traffic channel recovery circuits connected to receive a plurality of spread IF signals and by further despreading and spreading by orthogonal codes recovering identities of individual traffic channels;

each traffic channel recovery circuit including:

circuitry for despreading an IF signal with one of said orthogonal codes to prevent overlapping of channels within a beam;

circuitry for integrating the despread IF signal to recover signals at a symbol rate;

circuitry respreading the IF signal with the orthogonal code to uniquely identify channel users; and circuitry for respreading the IF signal by a pseudo-random beam code to identify the outgoing beam code carrying channel to its destination.

10. A switching system for switching in the sky a channel from an incoming spread spectrum RF beam to an outgoing spread spectrum RF beam, as claimed in claim 9, further comprising:

circuitry for over spreading the output beam to separate different output beams.

11. A switching system for switching in the sky a channel from an incoming spread spectrum RF beam to an outgoing spread spectrum RF beam, as claimed in claim 9, wherein:

the means for applying includes a mixer circuit for despreading an IF signal with a pseudo-random beam code $g_n$.

* * * * *

UNITED STATES PATENT AND TRADEMARK OFFICE
CERTIFICATE OF CORRECTION

PATENT NO. : 5,815,527
DATED : September 29, 1998
INVENTOR(S) : Richard Henry Erving, et al.

It is certified that error appears in the above-identified patent and that said Letters Patent is hereby corrected as shown below:

On the title page, item [73] add Assignee:

AT&T Corp.
New York, New York

Signed and Sealed this

Twelfth Day of October, 1999

Q. TODD DICKINSON

*Attest:*

*Attesting Officer*     *Acting Commissioner of Patents and Trademarks*